US012581299B2

(12) United States Patent　　(10) Patent No.:　US 12,581,299 B2
Björn et al.　　(45) Date of Patent:　Mar. 17, 2026

(54) SENSOR DATA CONTROL

(71) Applicant: Telefonaktiebolaget LM Ericsson (publ), Stockholm (SE)

(72) Inventors: Michael Björn, Malmö (SE); Alexander Hunt, Tygelsjö (SE); Andreas Kristensson, Södra Sandby (SE); Fredrik Dahlgren, Lund (SE); Håkan Englund, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 91 days.

(21) Appl. No.: 18/721,686

(22) PCT Filed: Dec. 20, 2021

(86) PCT No.: PCT/EP2021/086906
§ 371 (c)(1),
(2) Date: Jun. 19, 2024

(87) PCT Pub. No.: WO2023/117049
PCT Pub. Date: Jun. 29, 2023

(65) Prior Publication Data
US 2025/0063361 A1　　Feb. 20, 2025

(51) Int. Cl.
*H04W 12/069*　　(2021.01)
*H04W 12/02*　　(2009.01)

(52) U.S. Cl.
CPC ......... *H04W 12/069* (2021.01); *H04W 12/02* (2013.01)

(58) Field of Classification Search
CPC .............. H04W 12/069; H04W 12/02; H04M 1/72454; G06F 21/44; G06F 21/57;
(Continued)

(56) References Cited

U.S. PATENT DOCUMENTS 9,679,144 B2 *　6/2017　Molnar ................. H04L 67/131
2016/0173959 A1 *　6/2016　Seema ............... H04N 21/6587
　　　　　　　　　　　　　725/116
(Continued)

FOREIGN PATENT DOCUMENTS

WO　　2015073612 A1　　5/2015

OTHER PUBLICATIONS

International Search Report and Written Opinion of the International Searching Authority, PCT/EP2021/086906, mailed Aug. 12, 2022, 13 pages.
(Continued)

*Primary Examiner* — J. Brant Murphy
(74) *Attorney, Agent, or Firm* — Sage Patent Group

(57)　　　　ABSTRACT

A method is disclosed for controlling provision of sensor data.

The method includes detecting a canvas request from the application, wherein the canvas request is associated with an execution request from the application to an application server.

The method also includes—based on a privacy certification status of the sensor—selectively causing the sensor data and the canvas request to be provided to a map server.

Provision of the sensor data and the canvas request to the map server causes a canvas response to be provided from the map server to the application. The canvas response is for processing by the application of an execution response provided by the application server in response to the execution request.

The sensor data is inaccessible to the application and to the application server. Corresponding computer program product, apparatus, sensor data management controller, wireless communication device, and system are also disclosed.

24 Claims, 3 Drawing Sheets

(58) Field of Classification Search
  CPC . G06F 21/6245; G06V 20/20; H04L 63/0823;
              H04L 63/10; H04L 67/12
  See application file for complete search history.

(56)                    References Cited

U.S. PATENT DOCUMENTS

| 2017/0162177 | A1* | 6/2017 | Lebeck | ............... | G06F 21/6218 |
| 2018/0069838 | A1* | 3/2018 | Lee | ..................... | G06F 21/6245 |
| 2019/0324986 | A1* | 10/2019 | Schwartz | .............. | G06F 3/0483 |
| 2021/0042994 | A1* | 2/2021 | Newcombe | ........... | G06T 19/006 |
| 2021/0133492 | A1* | 5/2021 | Lee | ........................ | G06F 18/251 |
| 2021/0192847 | A1* | 6/2021 | Nagaraja | ............... | G06T 19/006 |

OTHER PUBLICATIONS

Zhang, Xueling et al., "Privacy Assurance for Android Augmented
Reality Apps," 2019 IEEE 24th Pacific Rim International Sympo-
sium on Dependable Computing (PRDC), 2 pages.

* cited by examiner

_100_
110
Detect canvas request
120
Status?
↓OK
130
Cause provision of sensor data to spatial map server
140
Cause provision of canvas response to application
FIG. 1
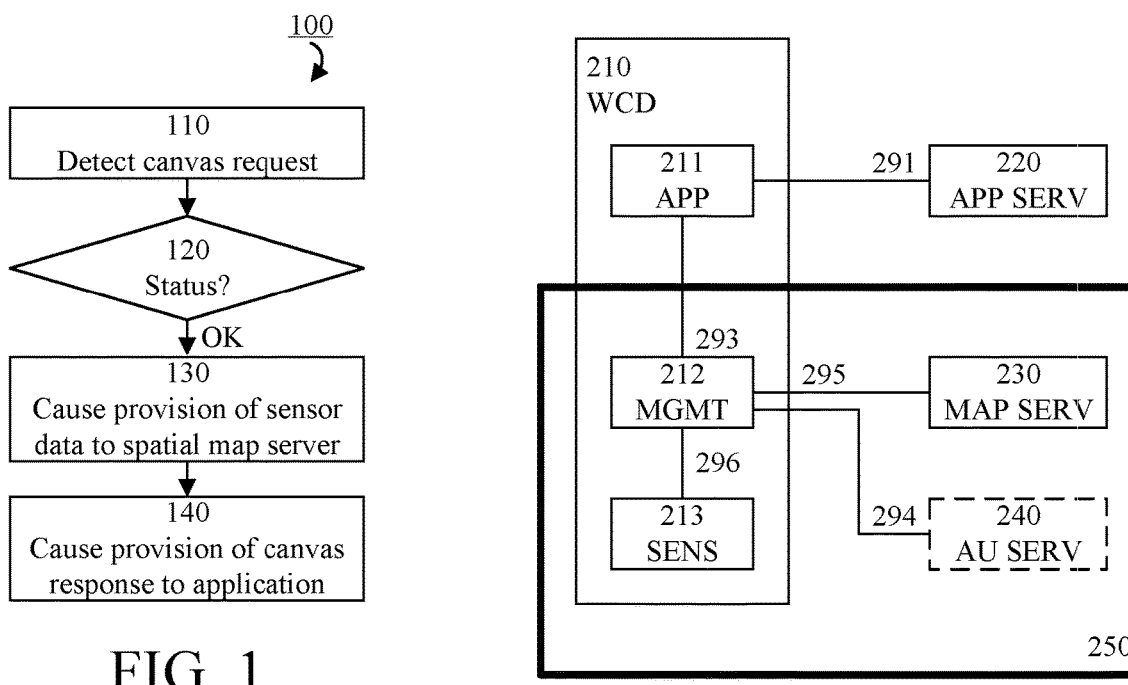
FIG. 2A
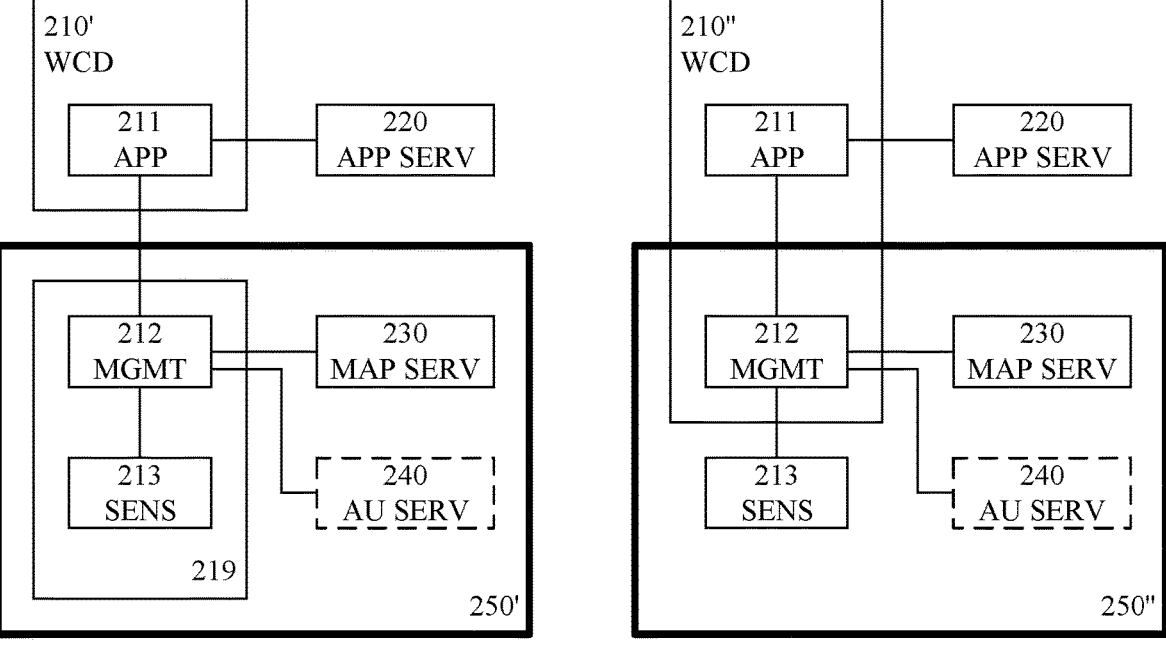
FIG. 2B          FIG. 2C

SENSOR DATA CONTROL

CROSS REFERENCE TO RELATED APPLICATIONS

This application is a 35 U.S.C. § 371 national stage application of PCT International Application No. PCT/EP2021/086906 filed on Dec. 20, 2021, the disclosure and content of which is incorporated by reference herein in its entirety.

TECHNICAL FIELD

The present disclosure relates generally to the field of data privacy. More particularly, it relates to privacy-driven control of sensor data in relation to an application running on a wireless communication device.

BACKGROUND

Increasing use of sensor data by various applications may be problematic due to that access to sensor data may violate the privacy of actors (e.g., persons, legal entities, national authorities, etc.) associated with the sensor data. For example, when a camera provides sensor data comprising a video, a person appearing in the video may be opposed to sharing of the video data.

There exist solutions that address this problem. For example, U.S. Pat. No. 9,679,144 B2 describes an augmented reality (AR) privacy application programming interface (API) to protect user privacy in AR scenarios.

However, the handling of sensor data may concern other actors than a first party (the user of a sensor and/or an application) and a second party (the provider of the application). Such other actor may involve any party contributing in any way to the sensor data. Example ways an actor may contribute to the sensor data include by appearing in a video, by being heard in a sound recording, by having interest in (e.g., having legal right to, suffering from privacy intrusion due to exposure of, suffering from security intrusion due to exposure of, etc.) an object—or information deducible therefrom—that appears in a video and/or content—or information deducible therefrom—that appears in a sound recording, etc. Alternatively or additionally, any such actor may, for example, be referred to as a third party or a bystander. The term "bystander" will be used herein to refer to any actor which is neither a first party nor a second party.

Generally, a bystander may be defined as an actor (e.g., a person, a legal entity, a national authority, etc.) contributing to the sensor data (e.g., as exemplified above). Example environments that may involve a bystander include private environments (e.g., a private home, a private vehicle interior, a locker room, etc.), business sensitive environments (e.g., a factory, a laboratory interior, a mine, a construction site, etc.), national security environments (e.g., a military facility, a non-public area of a police station, etc.), and public environments comprising sensitive information (e.g., private information, business sensitive information, national security information, etc.). For example, sensitive information may be displayed via a document being visible, via speech being heard, via a storage location for keys being visible (e.g., a drawer where building keys are kept), or similar.

A bystander might have privacy concerns in relation to use of the sensor data that relates to the operation of the application. Furthermore, the bystander might not trust privacy approaches that are controllable by the first party and/or by the second party. This problem seems to be hitherto unaddressed; at least it is not addressed in a sufficiently reassuring manner.

Therefore, there is a need for alternative approaches to handling of sensor data in relation to operation of an application. Preferably, such approaches should provide bystander privacy.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method of controlling provision of sensor data from a sensor in relation to an application running on a wireless communication device.

The method comprises detecting a canvas request from the application, wherein the canvas request is associated with an execution request from the application to an application server.

The method also comprises—based on a privacy certification status of the sensor—selectively causing the sensor data and the canvas request to be provided to a map server.

Provision of the sensor data and the canvas request to the map server causes a canvas response to be provided from the map server to the application. The canvas response is for processing by the application of an execution response provided by the application server in response to the execution request.

According to the method, the sensor data is inaccessible to the application and to the application server.

In some embodiments, detecting the canvas request from the application comprises obtaining the canvas request from the application.

In some embodiments, causing the sensor data to be provided to the map server comprises conveying the sensor data to the map server.

In some embodiments, causing the sensor data to be provided to the map server comprises triggering the sensor to provide the sensor data to the map server.

In some embodiments, causing the canvas request to be provided to the map server comprises conveying the canvas request to the map server.

In some embodiments, the method further comprises obtaining the canvas response from the map server.

In some embodiments, the method further comprises conveying the canvas response to the application.

In some embodiments, the canvas response is provided directly from the map server to the application.

In some embodiments, selectively causing the sensor data and the canvas request to be provided to the map server based on the privacy certification status of the sensor comprises causing the sensor data and the canvas request to be provided to the map server when the sensor is approved according to the privacy certification.

In some embodiments, selectively causing the sensor data and the canvas request to be provided to the map server based on the privacy certification status of the sensor comprises hindering at least the sensor data from being provided to the map server when approval of the sensor according to the privacy certification is lacking.

In some embodiments, the privacy certification stipulates the sensor to be hindered from providing the sensor data to the application and stipulates the sensor to be hindered from providing the sensor data to the application server.

In some embodiments, the privacy certification requires the sensor to be able to constrain provision of sensor data, which relates to the application, to the map server.

In some embodiments, the canvas response is void of the sensor data.

In some embodiments, the canvas response is determined by the map server based on the sensor data and the canvas request.

In some embodiments, the canvas response comprises a parametrization determined from the sensor data and corresponding to the canvas request.

In some embodiments, the privacy certification is provided by a first trusted party for trusted provision of sensor data in association with operation of the application.

In some embodiments, the map server is controlled by a second trusted party.

In some embodiments, selectively causing the sensor data and the canvas request to be provided to a map server based on the privacy certification status of the sensor comprises applying an environmental sensor data sharing policy for hindering data relating to a bystander from being available to a provider of the application and/or the application server.

In some embodiments, the privacy certification status of the sensor is separately applicable to the sensor and/or is applicable to a device comprising the sensor.

In some embodiments, the privacy certification status of the sensor is indicative of one of a plurality of privacy certification levels.

In some embodiments, the method further comprises determining the privacy certification status of the sensor.

In some embodiments (e.g., for a system where an authorization server is deployed), the method further comprises transmitting an authorization request to an authorization server, wherein the authorization request is for authorization to provide sensor data from the sensor to the map server, and receiving an authorization response from the authorization server, wherein the authorization response is indicative of whether provision of sensor data from the sensor to the map server is authorized.

In some embodiments, the sensor is approved in accordance with the privacy certification when the sensor is certified to avoid sharing of sensor data with the application and/or with the application server.

In some embodiments, approval of the sensor in accordance with the privacy certification is conditioned on the sensor being configured for application of a sensor data sharing policy.

In some embodiments, the sensor data sharing policy is un-adjustable by one or more of a user of the wireless communication device, a user of the sensor, a user of the application, the application, a provider of the application, an execution platform hosting the application, a provider of an execution platform hosting the application, the application server, a provider of the application server, an execution platform hosting the application server, and a provider of an execution platform hosting the application server.

In some embodiments, the canvas comprises a spatial shape in one or more dimensions.

In some embodiments, the application is an augmented reality (AR) application and/or an extended reality (XR) application and/or a virtual reality (VR) application.

In some embodiments, the method is performed by a sensor data management controller.

In some embodiments, the privacy certification requires the sensor to be able to constrain provision of sensor data in relation to the application only to the sensor data management controller.

In some embodiments, selectively causing the sensor data and the canvas request to be provided to the map server is further based on whether a canvas request threshold has been exceeded by the application.

In some embodiments, the method further comprises detecting a further canvas request from the application, wherein the further canvas request is associated with a further execution request from the application to the application server, and (when less than a specified duration of time has elapsed since previous sensor data was provided) causing only the further canvas request to be provided to the map server. Provision of the further canvas request to the map server causes a further canvas response to be provided from the map server to the application, the further canvas response being for processing by the application of a further execution response provided by the application server in response to the further execution request.

In some embodiments, the further canvas response is determined by the map server based on the previous sensor data and the further canvas request.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for controlling provision of sensor data from a sensor in relation to an application running on a wireless communication device. The apparatus comprises controlling circuitry.

The controlling circuitry is configured to cause detection of a canvas request from the application, wherein the canvas request is associated with an execution request from the application to an application server, and—based on a privacy certification status of the sensor—selective provision of the sensor data and the canvas request to a map server.

Provision of the sensor data and the canvas request to the map server causes a canvas response to be provided from the map server to the application. The canvas response is for processing by the application of an execution response provided by the application server in response to the execution request.

The apparatus is configured to operate in a context wherein the sensor data is inaccessible to the application and to the application server. For example, the apparatus may be configured to hinder the sensor data to be accessed by either the application and the application server.

A fourth aspect is a sensor data management controller comprising the apparatus of the third aspect.

In some embodiments, the privacy certification requires the sensor to be able to constrain provision of sensor data in relation to the application only to the sensor data management controller.

A fifth aspect is a sensor device comprising a sensor and the sensor data management controller of the fourth aspect.

A sixth aspect is a wireless communication device comprising the sensor data management controller of the fourth aspect.

In some embodiments, the wireless communication device further comprises the application and/or the sensor.

A seventh aspect is a system for trusted provision of sensor data from a sensor in relation to operation of an application running on a wireless communication device.

The system comprises the sensor data management controller of the fourth aspect, and a map server configured to provide a canvas response corresponding to a canvas request and received sensor data, wherein the canvas response is void of the sensor data.

In some embodiments, the system further comprises the sensor.

In some embodiments, the system further comprises an authorization server configured to receive an authorization request for privacy certification authentication of the sensor, and to provide an authorization response indicative of whether the sensor is approved in accordance with the privacy certification in association with operation of the application.

In some embodiments, any of the above aspects may additionally have features identical with or corresponding to any of the various features as explained above for any of the other aspects.

An advantage of some embodiments is that alternative approaches are provided for handling of sensor data in relation to operation of an application.

An advantage of some embodiments is that bystander privacy is provided.

An advantage of some embodiments is that the privacy conditions may vary based on different conditions (e.g., as controlled by one or more trusted parties which are neither first party nor second party). For example, different privacy conditions may apply depending on one or more of: the location of the sensor, a movement of the sensor (e.g., a speed of the sensor), the type of the sensor, the type of the sensor data, the type of device the sensor is comprised in, the time during which the sensor data was collected, legal restrictions of a jurisdiction wherein the sensor data is collected, previous activity of a device comprising the application and/or the sensor and/or the sensor data management controller, legal restrictions of a jurisdiction wherein the application is operating, etc.

An advantage of some embodiments is that the privacy conditions may be dynamically adjusted (e.g., by a first trusted party which is neither first party nor second party). For example, a sensor data sharing policy can be changed over time without requiring changes to the privacy system as such and/or without hardware reconfiguration.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 1 is a flowchart illustrating example method steps according to some embodiments;

FIG. 2A is a schematic block diagram illustrating an example system setup according to some embodiments;

FIG. 2B is a schematic block diagram illustrating an example system setup according to some embodiments;

FIG. 2C is a schematic block diagram illustrating an example system setup according to some embodiments;

DETAILED DESCRIPTION

Figure 3:
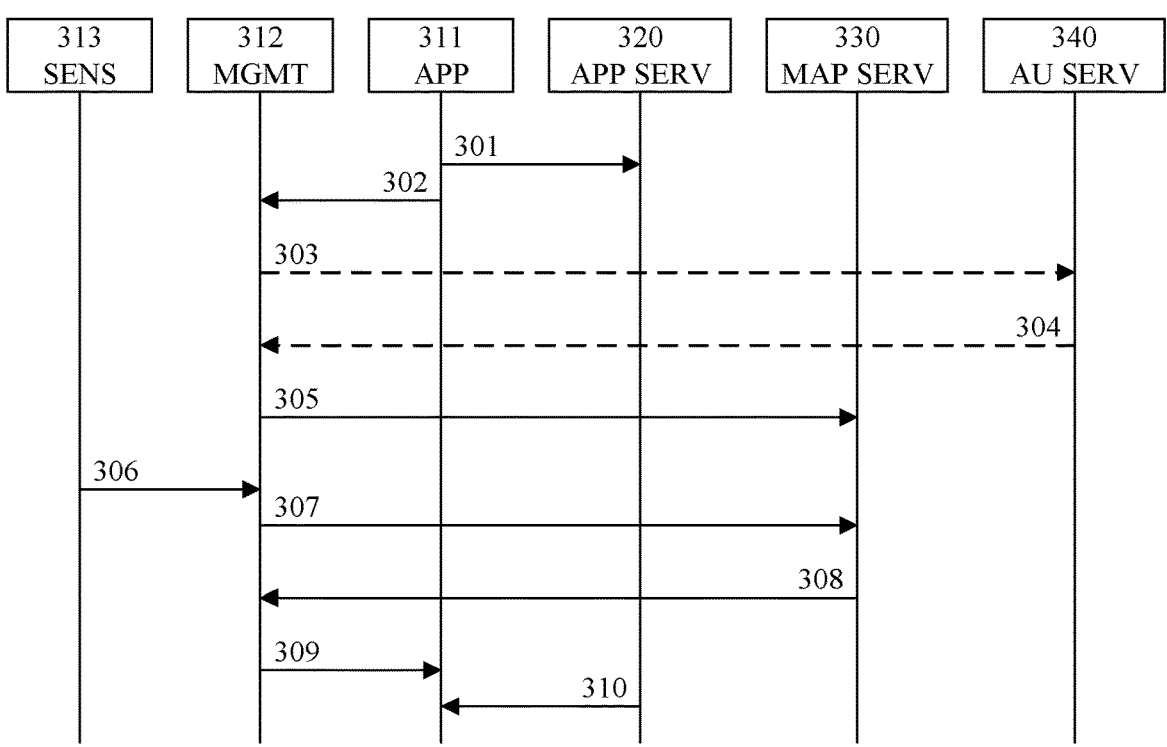
FIG. 3 is a signaling diagram illustrating example signaling according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, approaches to handling of sensor data in relation to operation of an application are presented. In some embodiments, the approaches provide bystander privacy.

FIG. 1 illustrates an example method 100 according to some embodiments. The method 100 is for controlling provision of sensor data from a sensor in relation to an application (typically a software application; e.g., an augmented reality application and/or an extended reality application and/or a virtual reality application) running on a wireless communication device. In some embodiments, the method 100 is for controlling provision of sensor data from a plurality of sensors in relation to an application running on a wireless communication device. Alternatively or additionally, the method 100 may be for controlling provision of sensor data from a sensor in relation to a plurality of applications running on a wireless communication device.

Generally, provision of sensor data may comprise outputting and/or transmission the sensor data, for example.

Also generally, controlling provision of sensor data from a sensor in relation to an application may be defined as referring to controlling provision of sensor data that is usable by any application (i.e., the control is typically not dependent on type or identity of the application, but is rather applied for all sensor data intended to be used by an application in general).

The sensor may be any suitable sensor and the sensor data may be any suitable data provided by a sensor. Some example sensor types include optical sensors (such as cameras, radar, lidar, light-field sensors, etc.), infrared sensors (such as cameras, radar, lidar, etc.), ultraviolet sensors (such as cameras, radar, lidar, etc.), magnetic field sensors, vibration sensors (such as microphones), pressure sensors, temperature sensors (such as thermometers), motion sensors (such as motion detectors or gyros), orientation sensors (such as gyros), location sensors (such as global positioning system—GPS), chemical sensors (e.g., for chemicals detectable by human senses, such as small and/or taste), and biometric sensors (such as heart rate monitors, breathing monitors, medical data monitors, fingerprint readers, retina readers, facial trait readers, etc.). Some example types of sensor data include image, video, sound, distance, tempera- ture, location, orientation, speed, and biometric data.

The operation of the application is associated with the sensor data (e.g., the operation of the application may depend on, or be based on, the sensor data). For example, an augmented reality application may be configured to place virtual objects within a rendering of the physical environ- ment (e.g., by rendering the virtual object super-positioned on a video stream from a camera). This task typically requires some knowledge regarding the physical environ- ment, which can be provided by a camera. Hence, the operation of the augmented reality (e.g., placing of virtual objects within a rendering of the physical environment) is based on the sensor data (e.g., image/video) provided by the sensor (e.g., camera).

During operation, the application is configured to send an execution request to an application server and subsequently receive an execution response. For example, the execution request may be a request to place a virtual object and the execution response may be indicative of the virtual object for placing (e.g., the execution response may comprise a digital representation of the virtual object).

In a straightforward implementation, the application or the application server might have access to the sensor data and use it for performance of a task at hand. For example, an augmented reality application might have access to image/video from a camera and use that information to place a virtual object received from the application server in an execution response, or the application server might have access to image/video from a camera and use that informa- tion to provide an execution response indicative of a placed virtual object to the application.

However, from the standpoint of a bystander (and possi- bly also from the standpoint of a user), it might not be preferable that the application and/or the application server has access to the sensor data. For example, it may not be believed that the application and/or application server use the sensor data only for the momentary operation of the application. Thus, the application and/or the application server may be untrusted for handling of the sensor data.

To this end, the method 100 provides an approach to control provision of the sensor data in relation to operation of the application. Thus, the method 100 comprises man- agement of how and/or when and/or whereto the sensor data is provided in scenarios where the sensor data is associated with operation of the application.

The method 100 may, for example, be performed by a sensor data management controller, and/or by the wireless communication device, and/or by a device comprising the sensor.

In step 110, a canvas request from the application is detected. Typically, step 110 may comprise obtaining (e.g., acquiring or receiving) the canvas request from the appli- cation.

In some embodiments, step 110 may comprise obtaining (e.g., acquiring or receiving) only a portion of the canvas request. For example, step 110 may comprise the sensor data management controller detecting that there is content in a canvas request transmission buffer of the application and extracting relevant portion(s) thereof.

Generally, a canvas may relate to any generalized repre- sentation of specified characteristics deducible from the sensor data.

For example, when the sensor data represents sound the canvas can be a specific tone (possibly with a specific duration) emanating from a specific direction, when the sensor data represents distance the canvas can be a direction where a specific distance is measured, etc.

Typically, a canvas may comprise (e.g., be defined as) a spatial shape in one or more (e.g., two, or three) spatial dimensions. For example, a canvas may be a surface or a volume.

Embodiments presented herein will use the situation where the canvas is related to a spatial shape for illustrative exemplification. Correspondingly, the map server will be exemplified as a spatial map server and a parametrization relating to the canvas will be exemplified as a spatial parametrization. It should be noted however, that this is not intended as limiting.

According to some further examples, a canvas may be a two-dimensional (flat or non-flat) surface within a three- dimensional space, a three-dimensional volume in a three- dimensional space, or—within a four-dimensional space (e.g., having three spatial dimensions and a time dimen- sion)—a two-dimensional surface or a three-dimensional volume valid during a time span.

Typically, the canvas is defined by one or more charac- teristics (e.g., size, form, orientation, etc.). To exemplify, a canvas may be a two-dimensional flat and horizontally oriented surface with circular boundary and a minimum acceptable radius, or a three-dimensional cube of any ori- entation and maximum acceptable volume.

In a typical example, the canvas enables the application to correctly render (e.g., place and move) digital objects in relation to the physical environment defined by the sensor data.

Generally, the canvas request may be indicative of a canvas that is required for performance of the task specified by a corresponding execution request.

Thus, the canvas request is associated with an execution request from the application to the application server. The canvas request and the execution request may be comprised in the same message output from the application, or may be comprised in different—but related, e.g., substantially simultaneous and/or cross-referenced—messages output from the application. Alternatively or additionally, the can- vas request is implicit from the execution request (e.g., a request to place a virtual object may entail characteristics of the canvas required to perform the placement).

Step 130 comprises causing the sensor data and the canvas request to be provided to a spatial map server.

Typically, the spatial map server is controlled and/or hosted by a trusted party. This trusted party is referred to herein as a second trusted party, as opposed to a first trusted party that manages (e.g., controls and/or adjusts) a sensor data sharing policy, as will be elaborated on later herein. For example, the spatial map server may be part of a network provided and/or controlled by the second trusted party.

The second trusted party may be a party other than one or more of: the bystander, the user of the sensor, the user of the wireless communication device, the user of the application, the application, the provider of the application, the execution platform hosting the application, the application server, the provider of the application server, the execution platform hosting the application server, and the provider of an execu- tion platform hosting the application and/or the application server.

Example second trusted parties include: providers of cellular communication networks (e.g., operators), providers of cloud services, providers of other relevant platforms, and operators of arenas and/or event facilities.

Alternatively or additionally, the spatial map server is not comprised in the same device as the sensor. Yet alternatively or additionally, the spatial map server is not comprised in the wireless communication device. Further alternatively or additionally, the spatial map server is not comprised in the same device as the sensor data management controller.

Causing the sensor data to be provided to the spatial map server may comprise conveying the sensor data to the spatial map server (e.g., obtaining the sensor data from the sensor and relaying, or repackaging and sending, the sensor data to the spatial map server), or triggering the sensor to provide the sensor data to the spatial map server (e.g., the sensor data not being conveyed via the sensor data management controller).

When step 110 comprises obtaining the canvas request from the application, causing the canvas request to be provided to the spatial map server may comprise conveying the canvas request to the spatial map server, or otherwise triggering the canvas request to be provided to the spatial map server (e.g., controlling a canvas request transmission buffer of the application to send its content). When step 110 comprises detecting the canvas request without actually obtaining it in full, causing the canvas request to be provided to the spatial map server may comprise triggering the canvas request to be provided to the spatial map server.

There is a selectivity condition for execution of step 130 (i.e., causing provision of the sensor data and the canvas request to the spatial map server is selective). The selectivity condition is based on a privacy certification status of the sensor. This is exemplified by step 120 in FIG. 1. When the privacy certification is in order for the sensor (privacy certification status OK; e.g., when the sensor is approved according to the privacy certification), the method 100 proceeds to step 130 as illustrated in FIG. 1. When the privacy certification is not in order for the sensor (e.g., when approval of the sensor according to the privacy certification is lacking), or the canvas request is denied for any other reason, the method 100 is typically aborted (not shown in FIG. 1).

Generally, a sensor may be considered as approved according to the privacy certification when one or more conditions associated with the privacy certification are fulfilled for the sensor. Example conditions include: that the sensor is certified according to the privacy certification, that such certification can be verified (e.g., by authentication of the sensor), that a level of the privacy certification for the sensor is sufficiently high for the applicable conditions of the sensor (e.g., type of sensor data, environmental conditions, etc.), and that a sensor data sharing policy associated with the privacy certification of the sensor allows sensor data sharing for the applicable conditions of the sensor (e.g., type of sensor data, environmental conditions, etc.).

Also generally, the selectivity condition for execution of step 130 may comprise any one or more suitable determinations that relate to the privacy certification status of the sensor.

For example, step 120 may comprise determining whether the sensor is approved according to the privacy certification. Such determination may comprise checking whether the sensor is certified and/or checking whether a certified sensor is authorized for provision of sensor data in relation to the application. This process may be referred to as verification and may, for example, be performed via an authorization server and/or via a token issued for the sensor.

Authorization may, for example, depend on one or more of: a level of privacy certification that applies to the sensor, an applicable sensor data sharing policy, and environmental conditions of the sensor.

Thus, steps 120 and 130 of FIG. 1 may be seen as illustrating selectively causing the sensor data and the canvas request to be provided to the spatial map server based on the privacy certification status of the sensor. For example, steps 120 and 130 of FIG. 1 may be seen as illustrating selectively causing the sensor data and the canvas request to be provided to the spatial map server based on an authorization decision for the sensor, wherein the authorization decision may include checking the privacy certification status and/or the sensor data sharing policy.

When the sensor is approved according to the privacy certification (e.g., when the sensor is successfully verified), the sensor data and the canvas request are caused to be provided to the spatial map server. When approval of the sensor according to the privacy certification is lacking (e.g., when the sensor is not verified), at least the sensor data (and possibly also the canvas request) is hindered from being provided to the spatial map server.

For example, approval may be considered to be lacking when there is no evidence that the sensor fulfils requirements of the privacy certification; wherein the requirements are possibly depending on the current conditions of the sensor (e.g., location). Some examples are provided as follows.

When the sensor is not certified, approval may be considered to be lacking. When the sensor is certified but not at a sufficiently high level (e.g., in relation to current conditions), approval may be considered to be lacking. When authentication of the sensor fails in an authorization process, approval may be considered to be lacking. When verification of certification for the sensor fails in an authorization process (e.g., for a device whose root key is not trusted in a jurisdiction/country to which it has been imported), approval may be considered to be lacking. When an applicable environmental sensor data sharing policy is not fulfilled, approval may be considered to be lacking.

In some embodiments, the sensor is pre-approved according to the privacy certification. Information indicating the pre-approval may be available at the sensor data management controller according to some embodiments.

Alternatively or additionally, the method 100 may comprise (e.g., as part of step 120) determining the privacy certification status of the sensor. The determination of the privacy certification status of the sensor may typically comprise determining an authorization status of the sensor, wherein the authorization status depends on the privacy certification status.

In some embodiments, an authentication procedure is applied to establish whether or not there is a valid privacy certification for the sensor and/or a device comprising the sensor.

In some embodiments, the determination of the privacy certification status (e.g., the authorization status) of the sensor is implicitly made locally (e.g., by the sensor data management controller itself, or by a device comprising the sensor data management controller). This approach may be applicable, for example, when privacy certification can be successfully verified locally. In some embodiments, environmental requirements (e.g., location, etc.) are also evaluated locally.

Alternatively or additionally, the determination of the privacy certification status may comprise transmitting an authorization request to an authorization server, wherein the authorization request is for authorization to provide sensor data from the sensor to the map server, and receiving an authorization response from the authorization server, wherein the authorization response is indicative of whether provision of sensor data from the sensor to the map server is authorized. For example, the authorization response may be indicative of whether the sensor and/or the device comprising the sensor is approved in accordance with the privacy certification for provision of sensor data in association with operation of the application.

In some embodiments, the authorization request may comprise information established during a previously performed authentication procedure (e.g., privacy certification status of the sensor, level of the privacy certification for the sensor, positioning information of the sensor, other environmental information of the sensor, etc.).

In some embodiments, the authorization response is sent as a token, that may be verified on multiple occasions without passing messages to the authorization server on each occasion.

Typically, the authorization server is controlled and/or hosted by a trusted party (e.g., the same trusted party that controls/hosts the spatial map server). For example, the authorization server may be part of a network provided and/or controlled by the second trusted party. The authorization server and the spatial map server may be integrated within a same server node, or may be implemented as separate server nodes.

The authorization server may apply any suitable authorization approach (e.g., Rule Based Access Control (RBAC) or Attributed Based Access Control (ABAC)) to provide the authorization response using any suitable protocol (e.g., Security Assertion Markup Language (SAML) or OAuth 2.0) based on the authorization request. For example, the authorization server may have a data base comprising information indicating approval according to the privacy certification for one or more sensor identities. The authorization request may be indicative of an identity of the sensor (and possibly also of the application and/or the privacy certification), and the authorization server may be configured to determine whether the indicated sensor identity appears in the data base (indicating privacy certification for the application). If so, the authorization response may be indicative of a confirmation that the sensor is approved according to the privacy certification. Otherwise, the authorization response may be indicative of that approval for the censor according to the privacy certification is lacking. In some embodiments, an authorization response indicative of a confirmation that the sensor is approved according to the privacy certification may also be indicative of a privacy certification level for the sensor. Alternatively or additionally, an authorization response indicative of a confirmation that the sensor is approved according to the privacy certification may also be indicative of conditions (if any) that must be fulfilled for the approval to be valid (e.g., environmental conditions).

The authorization (i.e., determination of the privacy certification status) of the sensor may, for example, be performed once, periodically, or triggered by an event (e.g., triggered by step 110). Alternatively or additionally, the authorization of the sensor as approved according to the privacy certification may be valid for a single canvas request only, for a specified number of canvas requests, for a specified duration of time, or indefinitely.

Generally, approval according to the privacy certification for a sensor may apply to the sensor only, or to a device that comprises the sensor (e.g., the wireless communication device). Hence, the privacy certification status and/or the authorization status of the sensor may be separately applicable to the sensor and/or may be applicable to the device comprising the sensor.

Also generally, it should be noted that, even though the examples given herein relate to one sensor, one application and one privacy certification, this is not intended as limiting. Contrarily, embodiments are meant to be equally applicable to scenarios where there are a plurality of (e.g., two or more) sensors and/or a plurality of (e.g., two or more) applications and/or a plurality of (e.g., two or more) privacy certifications.

For example, a sensor may be approved according to some privacy certification(s) and may be un-approved according to other privacy certification(s).

When there are more than one sensor (e.g., comprised in, or otherwise associated with, the same device) all of them may be approved according to a privacy certification for sensor data provision, or only some of them may be approved according to the privacy certification. Furthermore, all sensors that are approved according to the privacy certification may be authorized to provide sensor data in relation to an application, or only some of the sensors that are approved according to the privacy certification may be authorized to provide sensor data in relation to an application.

Generally, the approval of a sensor according to a privacy certification (e.g., authorization for sensor data provision in relation to an application) may be based on one or more of: the type of the sensor, the certification level of the sensor, the type of the sensor data, the provider (e.g., manufacturer, operator, etc.) of the sensor, and the provider (e.g., manufacturer, operator, etc.) of the device in which the sensor is comprised. For example, all cameras may be approved for provision of image data in relation to a sensor data sharing policy, while no other sensors are approved for provision of sensor data according to the sensor data sharing policy.

Typically, selectively causing the sensor data and the canvas request to be provided to a map server based on the privacy certification status of the sensor comprises applying an environmental sensor data sharing policy that requires that sensor data is hindered from being provided to the application and/or the application server. For example, the privacy certification may incorporate requirements for the wireless communication device and/or the sensor(s) to enforce the environmental sensor data sharing policy. Thus, the sensor data is inaccessible to the application and to the application server (e.g., due to the applications and/or the applications server being untrusted).

Thus, the privacy certification may be configured to hinder the sensor and/or the sensor data management controller from providing the sensor data to the application and to hinder the sensor and/or the sensor data management controller from providing the sensor data to the application server. Thereby, the sensor data can be made inaccessible to the application and to the application server.

Alternatively or additionally, an authorization policy (e.g., incorporating the sensor data sharing policy) related to the privacy certification may constrain the sensor and/or the sensor data management controller to providing sensor data, which relates to the application, to the spatial map server. Thereby, the sensor data can be made inaccessible to the application and to the application server. Alternatively or additionally, direct access to the sensor data by the map server can be hindered. For example, the authorization response may constrain the sensor to provide sensor data in relation to the application only to the sensor data management controller, and may possibly constrain the sensor data management controller to provide sensor data only to the spatial map server.

Yet alternatively or additionally, the privacy certification may require that the sensor data is only provided within a privacy zone. The privacy zone may, for example, comprise the sensor, the sensor data management controller, the map server, and—possibly—the authorization server. The privacy zone typically comprises neither the application nor the application server.

Thus, the sensor may be approved in accordance with the privacy certification when the sensor is certified to avoid sharing of sensor data (directly or indirectly) with the application and/or with the application server.

Alternatively or additionally, approval of the sensor in accordance with the privacy certification may be conditioned on a sensor data sharing policy (e.g., incorporated in the authorization policy). A sensor data sharing policy may control sharing of sensor data in relation to an application based, for example, on one or more of: the location of the sensor, the movement of the sensor (e.g., the speed of the sensor), the type of the sensor, the type of the sensor data, the type of device the sensor is comprised in, the time during which the sensor data was collected, legal restrictions (e.g., authority regulations) of a jurisdiction wherein the sensor data is collected, previous activity of the wireless communication device, legal restrictions (e.g., authority regulations) of a jurisdiction wherein the application is operating, etc.

The sensor data sharing policy may, typically, be unadjustable by one or more of a user of the wireless communication device, a user of the sensor, a user of the application, the application, a provider of the application, an execution platform hosting the application, a provider of an execution platform hosting the application, the application server, a provider of the application server, an execution platform hosting the application server, and a provider of an execution platform hosting the application server. Alternatively or additionally, the sensor data sharing policy may be controlled by and/or adjustable only by a first trusted party.

To this end, the privacy certification may be provided by a first trusted party. Typically, but not necessarily, the first trusted party is different from the second trusted party.

Typically, the first trusted party neither is, nor comprises, either of: a bystander, a user of the wireless communication device, a user of the sensor, a user of the application, the application, a provider of the application, an execution platform hosting the application, the application server, a provider of the application server, and an execution platform hosting the application server, and a provider of an execution platform hosting the application and/or the application server.

Example first trusted parties include: governmentally controlled certification entities (e.g., governmental mapping and geographic information authorities), suppliers of devices (e.g., wireless communication devices, peripheral devices, etc.). For example, an accredited certification entity (e.g., an accredited certification laboratory) could be commissioned to perform testing in relation to the privacy certification and to issue a verifiable statement about sensors/devices that have been certified. This entity would form part of an authentication system since it assures that the sensor/device fulfils certain requirements.

According to some embodiments, provision of the privacy certification may be for trusted provision of sensor data in association with operation of the application.

Trusted provision of sensor data may, for example, be defined as provision of the sensor data while ensuring that the sensor data is inaccessible to (i.e., does not reach) the applications and the application server. As elaborated on above, this can be achieved by one or more of: hindering the sensor and/or the sensor data management controller from providing the sensor data to the application or the application server, constraining the sensor to providing sensor data to the sensor data management controller and/or the spatial map server, constraining the sensor data management controller to providing sensor data to the spatial map server, constraining the quality of service of the map server (e.g., constraining one or more of: a canvas resolution, a number or allowed canvas requests, a number of canvas responses, and a type of responses), and ensuring that the sensor data is only provided within a privacy zone.

According to some embodiments, the sensor data sharing policy is an environmental sensor data sharing policy (i.e., a policy wherein sharing is conditioned on one or more aspects regarding the environment wherein the sensor resides) for hindering data collected by the sensor and relating to a bystander (e.g., a person, a legal entity, etc.) associated with the environment from being available to a provider of the application and/or the application server. A bystander associated with the environment may, for example, be defined as an actor (other than the user of the application) which is associated with (e.g., contributing in some manner—as exemplified previously—to) the sensor data.

When a sensor is approved to provide sensor data in relation to an application, there may be additional sensor data sharing conditions imposed by the privacy certification. For example, selectively causing the sensor data and the canvas request to be provided to the spatial map server may be further based on whether a canvas request threshold has been exceeded by the application or by the sensor data management controller.

The canvas request threshold may, for example, define a maximum number of canvas requests (e.g., per time unit) that is allowed for an application. When the canvas request threshold is not exceeded, the sensor data and the canvas request may be provided to the spatial map server, and when the canvas request threshold is exceeded, the sensor data and/or the canvas request may be hindered from being provided to the spatial map server. Typically, the canvas request is denied (i.e., hindered from being provided to the spatial map server) when the canvas request threshold is exceeded.

The value of the canvas request threshold may, for example, be provided by the authorization server. Alternatively or additionally, the value of the canvas request threshold may be based on a level of the privacy certification of the sensor.

The approaches that apply a canvas request threshold may be beneficial to mitigate an attempt (e.g., by a malicious applications) to deduce sensor data content without access to the sensor data. For example, requesting a huge amount of different canvases may enable mapping of an environment from the provided canvases alone (i.e., even without access to the sensor data from which the canvases are derived).

Referring again to FIG. 1, step 140 illustrates that provision of the sensor data and the canvas request to the spatial map server (step 130) causes a canvas response to be provided from the spatial map server to the application. The canvas response is for processing by the application of an execution response provided by the application server in response to the execution request.

In some embodiments, step 140 comprises conveying the canvas response to the application (e.g., obtaining, acquiring, or receiving, the canvas response from the spatial map server and relaying, or repackaging and sending, the canvas response to the application).

In some embodiments, the canvas response is provided (directly, autonomously) from the spatial map server to the application (e.g., the canvas response not being conveyed via the sensor data management controller). Thus, according to some embodiments, the sensor data management controller is not actively involved in the provision of the canvas response after execution of step 130.

The canvas response may be associated with the execution response from the application server to the application. The canvas response and the execution response may be comprised in the same message input to the application, or may be comprised in different—but related, e.g., substantially simultaneous and/or cross-referenced—messages input to the application.

The canvas response is typically void of (i.e., does not comprise any portion of) the sensor data. Thereby, the sensor data can be made inaccessible to the application and to the application server.

The canvas response is typically determined by the spatial map server based on the sensor data and the canvas request. Alternatively or additionally, the canvas response comprises a spatial parametrization determined from the sensor data and corresponding to the canvas request.

A spatial parametrization may be according to any suitable approach. In some embodiments, a spatial parametrization may comprise a digital representation of one or more canvases that correspond to spatial structures found in the sensor data and meeting the conditions defined by the canvas request. A canvas may be defined as a spatial shape in one or more dimensions, which may be described by a generalized geometric description (e.g., a spatial parametrization). For example, the generalized geometric description for the canvas may comprise a polygon or triangle mesh model calculated from the sensor data by the spatial map server. Spatial points in the generalized geometric description for the canvas may, for example, be defined by a suitable coordinate system (e.g., Cartesian coordinates).

Generally, the canvas response may be indicative of one or more canvases. When only one canvas meeting the conditions defined by the canvas request can be derived from the sensor data, the canvas response may indicate such canvas. When several canvases meeting the conditions defined by the canvas request can be derived from the sensor data, the canvas response may indicate one (e.g., a most preferred) of these canvases or several (e.g., all) of these canvases. Furthermore, when no canvas meeting the conditions defined by the canvas request can be derived from the sensor data, the canvas response may indicate that no canvas is available.

In some embodiments, the quality of service provided by the map server for the application by means of the canvas response is determined by the map server based on a level of the privacy certification. For example, the quality of service may relate to a resolution of the canvas representation (e.g., a resolution of the parametrization) and/or to a value of the canvas request threshold (e.g., a number of allowed canvas requests), wherein a relatively high level of privacy certification may entail a relatively high resolution and/or a relatively high canvas request threshold value.

In some embodiments, the privacy certification level and/or the quality of service to be applied is indicated in the authorization response (e.g., as a token from the authorization server, which can be forwarded and verified by the map server).

Generally, it should be noted that the provision of sensor data may relate to all available sensor data, or to only a subset thereof.

For example, when the map server has already received a sufficient amount of video data (from the device under consideration or from one or more other devices) to have an accurate representation of three-dimensional space, the provision of sensor data in step 130 may relate only to provision of position sensor data and/or orientation sensor data, and not to image sensor data. Then, the map server may provide the canvas response based on the previously received video data and on the position and/or orientation sensor data.

In some embodiments, no sensor data need to be provided at all when less than a specified duration of time has elapsed since previous sensor data was provided (by the device performing the method 100, and/or by one or more other device(s), as suitable). Thus, when a canvas request from the application is detected and less than a specified duration of time has elapsed since previous sensor data was provided, only the further canvas request may be provided to the map server. Then, the map server may provide the canvas response based on the previous sensor data.

FIG. 2A schematically illustrates an example system setup according to some embodiments. The system setup comprises a wireless communication device (WCD) 210, an application server (APP SERVER) 220, a spatial map server (MAP SERV) 230, and—optionally—an authorization server (AU SERV) 240.

The WCD 210 comprises an application (APP) 211, a sensor (SENS) 213, and a sensor data management controller (MGMT) 212.

The sensor 213 and the sensor data management controller 212 are operatively connected to each other as illustrated by 296. The application 211 and the sensor data management controller 212 are operatively connected to each other as illustrated by 293. The application 211 and the application server 220 are operatively connected to each other as illustrated by 291. The sensor data management controller 212 and the application server 230 are operatively connected to each other as illustrated by 295. The sensor data management controller 212 and the (optional) authorization server 240 are operatively connected to each other as illustrated by 294.

The system may be for trusted provision of sensor data from the sensor in relation to operation of the application. To this end, the sensor 213, the sensor data management controller 212, the spatial map server 230, and the (optional) authorization server 240 are comprised in a privacy zone 250; as well as the operative connections 294, 295, 296. 65.

The system setup of FIG. 2A may be suitable for controlling provision of sensor data from the sensor 213 in relation to the application 211 running on the wireless communication device 210. For example, the sensor data management controller 212 may be configured to perform the method 100 of FIG. 1.

The sensor data management controller 212 may be configured to receive a canvas request from the application 211 via connection 293 (compare with step 110 of FIG. 1), wherein the canvas request is associated with an execution request from the application to an application server via connection 291.

The sensor data management controller 212 may also be configured to receive sensor data from the sensor 213 via connection 296.

The sensor data management controller 212 may be further configured to selectively provide—based on a privacy certification status of the sensor (e.g., based on the authorization status of the sensor in relation to a sensor data sharing policy)—the sensor data and the canvas request to the spatial map server 230 via connection 295 (compare with steps 120 and 130 of FIG. 1). The selectivity may take any suitable form (e.g., as described in connection with FIG. 1). For example, the selectivity may be based on authorization signaling between the sensor data management controller 212 and the (optional) authorization server 240.

The sensor data management controller 212 may also be configured to receive a canvas response from the spatial map server 230 via connection 295 and provide it to the application 211 via connection 293 (compare with step 140 of FIG. 1). The canvas response is for processing by the application 211 of an execution response provided in response to the execution request to the application 211 by the application server 200 via connection 291.

By keeping the sensor data within the privacy zone 250, the sensor data is made inaccessible to the application 211 and to the application server 230.

FIG. 2B schematically illustrates an example system setup according to some embodiments. The system setup comprises a wireless communication device (WCD) 210', an application server (APP SERVER) 220, a spatial map server (MAP SERV) 230, and—optionally—an authorization server (AU SERV) 240. The WCD 210' comprises an application (APP) 211. The system also comprises a device 219, which is separate from the WCD 210'. The device 219 comprises a sensor (SENS) 213, and a sensor data management controller (MGMT) 212.

The system may be for trusted provision of sensor data from the sensor in relation to operation of the application. To this end, the device 219 (including the sensor 213, and the sensor data management controller 212), the spatial map server 230, and the (optional) authorization server 240 are comprised in a privacy zone 250'.

The system setup of FIG. 2B may be suitable for controlling provision of sensor data from the sensor 213 in relation to the application 211 running on the wireless communication device 210'. For example, the sensor data management controller 212 may be configured to perform the method 100 of FIG. 1.

Details described in connection with the system setup of FIG. 2A are generally applicable also to the system setup of FIG. 2B.

FIG. 2C schematically illustrates an example system setup according to some embodiments. The system setup comprises a wireless communication device (WCD) 210", an application server (APP SERVER) 220, a spatial map server (MAP SERV) 230, and—optionally—an authorization server (AU SERV) 240. The WCD 210" comprises an application (APP) 211 and a sensor data management controller (MGMT) 212. The system also comprises sensor (SENS) 213, which is separate from the WCD 210".

The system may be for trusted provision of sensor data from the sensor in relation to operation of the application. To this end, the sensor 213, the sensor data management controller 212, the spatial map server 230, and the (optional) authorization server 240 are comprised in a privacy zone 250".

The system setup of FIG. 2C may be suitable for controlling provision of sensor data from the sensor 213 in relation to the application 211 running on the wireless communication device 210". For example, the sensor data management controller 212 may be configured to perform the method 100 of FIG. 1.

Details described in connection with the system setup of FIG. 2A are generally applicable also to the system setup of FIG. 2C.

It should be noted that suitable features described in connection with FIG. 1 may be equally applicable—mutatis mutandis—in the context of any of FIGS. 2A-C, even if not explicitly mentioned in connection thereto.

FIG. 3 illustrates example signaling according to some embodiments. The signaling involves a sensor (SENS; compare with 213 of FIGS. 2A-C) 313, a sensor data management controller (MGMT; compare with 212 of FIGS. 2A-C) 312, an application (APP; compare with 211 of FIGS. 2A-C) 311, an application server (APP SERVER; compare with 220 of FIGS. 2A-C) 320, a spatial map server (MAP SERV; compare with 230 of FIGS. 2A-C) 330, and—optionally—an authorization server (AU SERV; compare with 240 of FIGS. 2A-C) 340.

The signaling diagram of FIG. 3 may illustratively describe some embodiments for controlling provision of sensor data from the sensor 313 in relation to the application 311. For example, the sensor data management controller 312 may be configured to perform the method 100 of FIG. 1.

An execution request 301 from the application 311 to the application server 320 is associated with a canvas request 302 from the application to the sensor data management controller 312. In the example of FIG. 3, the canvas request 302 is received by the sensor data management controller 312 from the application 311.

Based on a privacy certification status of the sensor 313 (e.g., based on the authorization status of the sensor in relation to a sensor data sharing policy), the sensor data management controller 312 selectively provides the canvas request to the spatial map server 330. In the example of FIG. 3, the received canvas request 302 is conveyed to the spatial map server 330 as illustrated by 305.

The sensor data management controller 312 receives sensor data 306 from the sensor 313. Also based on the privacy certification status of the sensor 313 (e.g., based on the authorization status of the sensor in relation to a sensor data sharing policy), the sensor data management controller 312 selectively provides the sensor data to the spatial map server 330. In the example of FIG. 3, the received sensor data 306 is conveyed to the spatial map server 330 as illustrated by 307.

The selectivity may take any suitable form (e.g., as described in connection with FIG. 1). For example, the selectivity may (optionally) be based on authorization signaling between the sensor data management controller 312 and the authorization server 340. This is illustrated in FIG. 3 by an authorization request 303 from the sensor data management controller 312 to the authorization server 340 and a corresponding authorization response 304 from the authorization server 340 to the sensor data management controller 312.

Provision of the sensor data 307 and the canvas request 305 to the spatial map server 330 causes a canvas response to be provided from the spatial map server 330. In the example of FIG. 3, the canvas response 308 from the spatial map server 330 is conveyed by the sensor data management controller 312 to the application 311 as illustrated by 309.

The canvas response is for processing by the application 311 of an execution response 310 provided by the application server 320 to the application 311 in response to the execution request 301.

It should be noted that—throughout the signaling of FIG. 3—the sensor data 306, 307 is never accessible to the application 311 or to the application server 320.

In some embodiments, the signaling 302 may be part of step 110 of FIG. 1, the signaling 303, 304 may be part of step 120 of FIG. 1, the signaling 305, 306, 307 may be part of step 140 of FIG. 1, and the signaling 308, 309 may be part of step 140 of FIG. 1.

Figure 4:
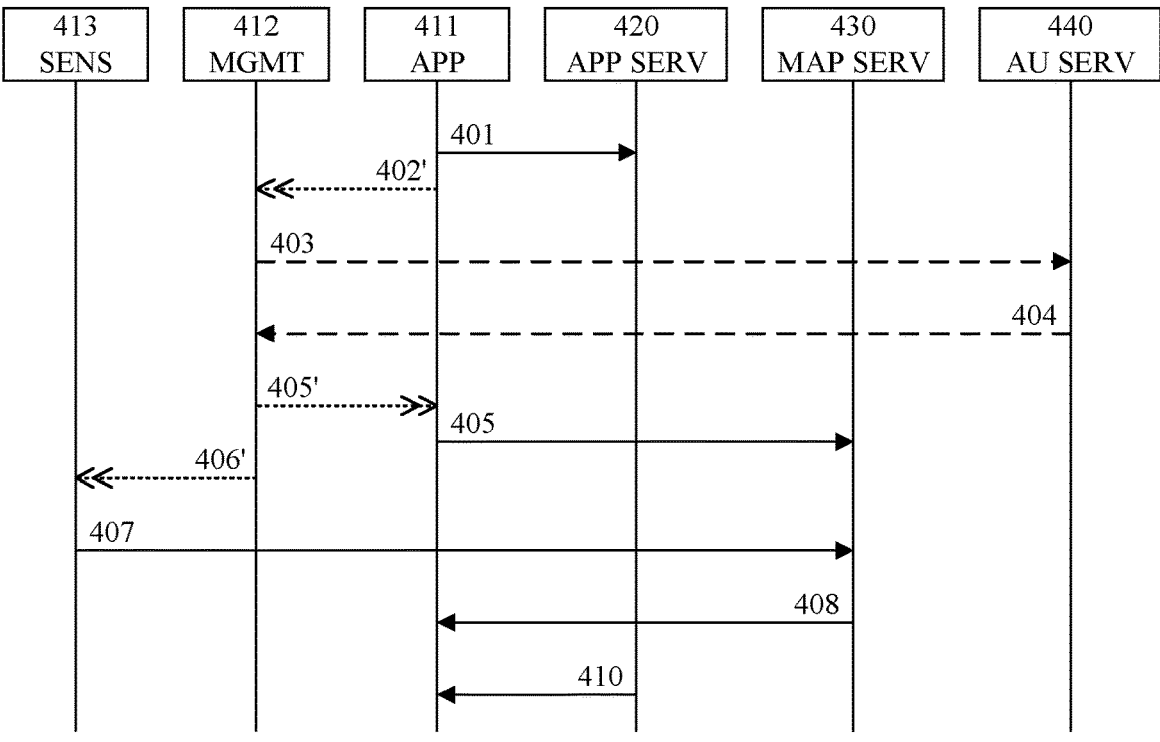
FIG. 4 is a signaling diagram illustrating example signaling according to some embodiments.

FIG. 4 illustrates example signaling according to some embodiments. The signaling involves a sensor (SENS) 413, a sensor data management controller (MGMT) 412, an application (APP) 411, an application server (APP SERVER) 420, a spatial map server (MAP SERV) 430, and—optionally—an authorization server (AU SERV) 440.

The signaling diagram of FIG. 4 may illustratively describe some embodiments for controlling provision of sensor data from the sensor 413 in relation to the application 411. For example, the sensor data management controller 412 may be configured to perform the method 100 of FIG. 1.

An execution request 401 from the application 411 to the application server 420 is associated with a canvas request from the application. The canvas request is detected by the sensor data management controller 412 as illustrated by 402'.

Based on a privacy certification status of the sensor 413 (e.g., based on the authorization status of the sensor in relation to a sensor data sharing policy), the sensor data management controller 412 selectively causes the canvas request to be provided to the spatial map server 430 as illustrated by 405. In the example of FIG. 4, the canvas request is not provided via the sensor data management controller 412. Instead, the sensor data management controller 412 triggers the application 411 to provide the canvas request 405 to the spatial map server 430 as illustrated by 405'.

Also based on the privacy certification status of the sensor 413 (e.g., based on the authorization status of the sensor in relation to a sensor data sharing policy), the sensor data management controller 412 selectively causes sensor data 407 to be provided from the sensor 413 to the spatial map server 430. In the example of FIG. 4, the sensor data not provided via the sensor data management controller 412. Instead, the sensor data management controller 412 triggers the sensor 413 to provide the sensor data 407 to the spatial map server 430 as illustrated by 406'.

The selectivity may take any suitable form (e.g., as described in connection with FIG. 1). For example, the selectivity may (optionally) be based on authorization signaling between the sensor data management controller 412 and the authorization server 440. This is illustrated in FIG. 4 by an authorization request 403 from the sensor data management controller 412 to the authorization server 440 and a corresponding authorization response 404 from the authorization server 440 to the sensor data management controller 412.

Provision of the sensor data 407 and the canvas request 405 to the spatial map server 430 causes a canvas response to be provided from the spatial map server 430. In the example of FIG. 4, the canvas response 408 from the spatial map server 430 is not provided via the sensor data management controller 412. Instead, the canvas response is provided directly from the spatial map server 430 to the application 411 as illustrated by 408.

The canvas response is for processing by the application 411 of an execution response 410 provided by the application server 420 to the application 411 in response to the execution request 401.

It should be noted that—throughout the signaling of FIG. 4—the sensor data 407 is never accessible to the application 411 or to the application server 420.

In some embodiments, the signaling 402' may be part of step 110 of FIG. 1, the signaling 403, 404 may be part of step 120 of FIG. 1, and the signaling 405', 406' may be part of step 140 of FIG. 1.

It should be noted that suitable features described in connection with FIGS. 1 and/or 2A-C may be equally applicable—mutatis mutandis—in the context of any of FIGS. 3 and/or 4, even if not explicitly mentioned in connection thereto.

Furthermore, it should be noted that features described in connection with FIG. 3 may be mixed with features described in connection with FIG. 4. For example, 302 and 305 of FIG. 3 may be replaced by 402', 405' and 405 of FIG. 4, and/or 306 and 307 of FIG. 3 may be replaced by 406' and 407 of FIG. 4, and/or 308 and 309 of FIG. 3 may be replaced by 408 of FIG. 4.

Figure 5:
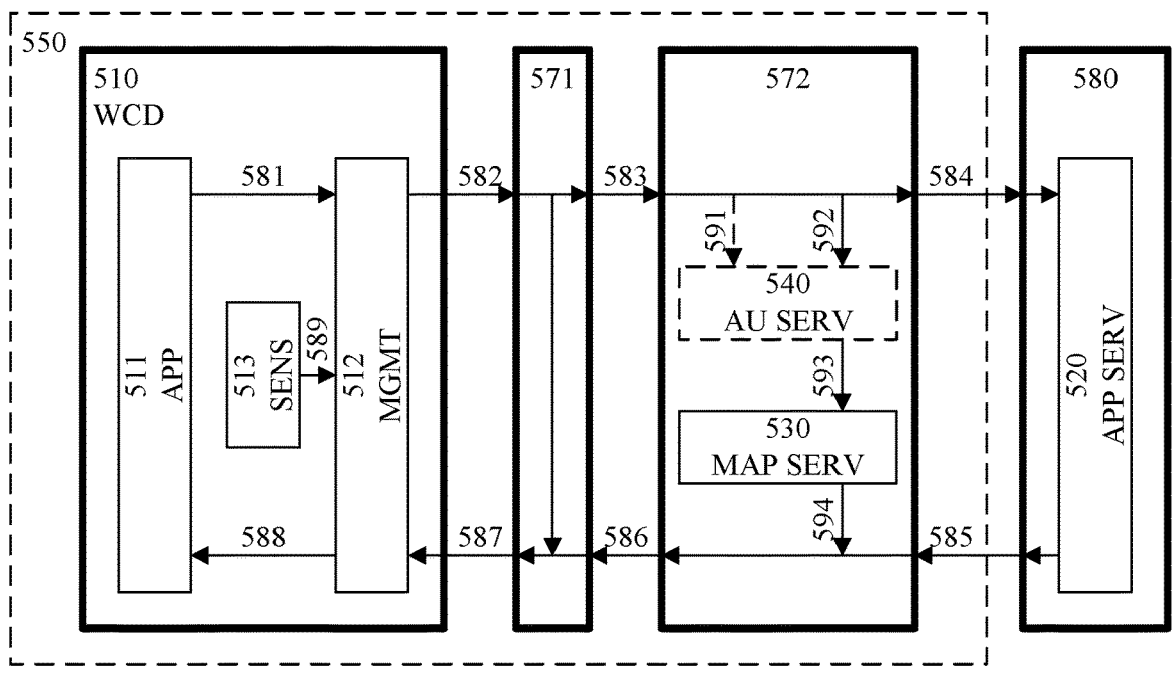
FIG. 5 is a schematic block diagram illustrating an example system function according to some embodiments.

FIG. 5 schematically illustrates an example system function according to some embodiments.

In FIG. 5, a system is shown as comprising a wireless communication device (WCD) 510, an application server (APP SERVER) 520, a spatial map server (MAP SERV) 530, and—optionally—an authorization server (AU SERV) 540. The WCD 510 comprises a sensor (SENS) 513, a sensor data management controller (MGMT) 512, and an application (APP) 511.

The system of FIG. 5 may illustratively describe some embodiments for controlling provision of sensor data from the sensor 513 in relation to the application 511. For example, the sensor data management controller 512 may be configured to perform the method 100 of FIG. 1. Alternatively or additionally, FIG. 5 may illustrative describe functions of any of the systems described in connection with FIGS. 2A-C.

Thus, the system of FIG. 5 may be for trusted provision of sensor data from the sensor in relation to operation of the application. To this end, the WCD 510, the spatial map server 530, and the authorization server 540 are comprised in a privacy zone 550.

The spatial map server 530 and the authorization server 540 are comprised in a first network (e.g., an edge network) comprising an application layer 572 (which functionally accommodates the spatial map server 530 and the authorization server 540) and an application transport layer 571. The application server is comprised in a second network 580 (e.g., the Internet).

The sensor data management controller 512 receives sensor data from the sensor 513, as illustrated by 589.

An execution request from the application 511 to the application server 520 is associated with a canvas request from the application 511 to the spatial map server 530. In the example of FIG. 5, the canvas request is received by the sensor data management controller 512 from the application 511, as illustrated by 581.

Based on a privacy certification status of the sensor 513, the sensor data management controller 512 selectively provides the sensor data and the canvas request to the spatial map server 530, as illustrated by 582, 583, 592, 593.

The selectivity may take any suitable form (e.g., as described in connection with FIG. 1). For example, the selectivity may (optionally) be based on authorization by the authorization server 540. In some embodiments, the sensor data and the canvas request are conveyed to the first network (illustrated by 582, 583, 592) in association with an authorization request, and are only provided within the network (illustrated by 593) to the spatial map server 530 if the authorization server 540 indicates approval. The provision of the authorization request is illustrated by 582, 583, 591.

Provision of the sensor data and the canvas request to the spatial map server 530 causes a canvas response to be provided from the spatial map server 530. In the example of FIG. 5, the canvas response from the spatial map server 530 is conveyed by the sensor data management controller 512 to the application 511 as illustrated by 594, 586, 587, 588.

The canvas response is for processing by the application 511 of an execution response 510 provided by the application server 520 to the application 511 in response to the execution request. The execution request may be carried to the first network in association with the sensor data and the canvas request and then to the second network, as illustrated by 581, 582, 583, 584. Similarly, the execution response may be carried from the second network and the from the first network in association with the canvas response, as illustrated by 585, 586, 587, 588.

The application transport layer 571 of the first network may, for example, be responsible for synchronization, rendering, latency, capacity, etc.

It should be noted that—throughout the operation according to FIG. 5—the sensor data is never accessible to the application 511 or to the application server 520.

It should be noted that suitable features described in connection with any of FIGS. 1-4 may be equally applicable—mutatis mutandis—in the context of FIG. 5, even if not explicitly mentioned in connection thereto.

Figure 6:
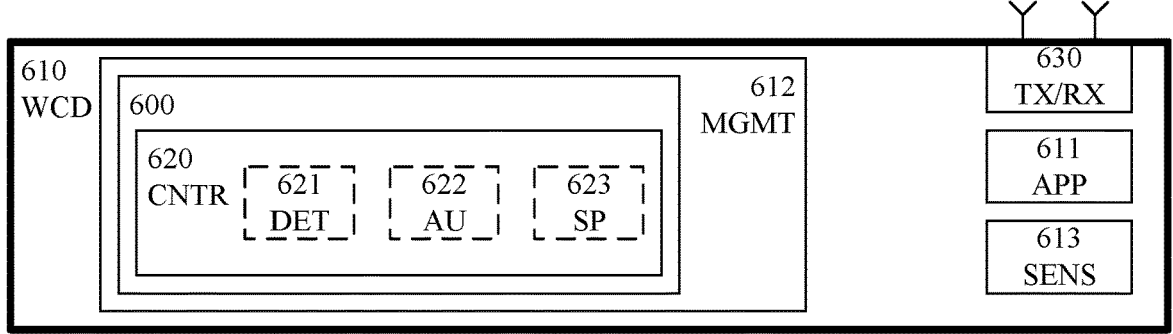
FIG. 6 is a schematic block diagram illustrating an example apparatus according to some embodiments.

FIG. 6 illustrates an example apparatus 600 according to some embodiments. The apparatus 600 is for controlling provision of sensor data from a sensor (SENS; compare with 213, 313, 413, 513) 613 in relation to an application (APP; compare with 211, 311, 411, 511) 611 running on a wireless communication device (WCD; compare with 210, 210', 210", 510) 610. For example, the apparatus 600 may be configured to cause performance of (e.g., perform) one or more of the method steps described in connection with FIG. 1.

The apparatus 600 comprises a controller (CNTR; e.g., controlling circuitry or a control module) 620. The controller 620 may be comprised in, or otherwise associated with (e.g., connectable, or connected, to), a sensor data management controller (MGMT; compare with 212, 312, 412, 512) 612.

In the example of FIG. 6, the apparatus 600 is comprised in the sensor data management controller (MGMT; compare with 212, 312, 412, 512) 612, which is in turn comprised in the WCD 610. However, in some embodiments, the apparatus 600 and/or the sensor data management controller 612 may be external to the WCD 610.

Furthermore, in the example of FIG. 6, the sensor 613 is comprised in the WCD 610. However, in some embodiments, the sensor 613 may be external to the WCD 610.

Generally, the sensor 613 may be comprised in the same device as the apparatus 600 and/or the sensor data management controller 612, or in a device separate from a device comprising the apparatus 600 and/or the sensor data management controller 612.

The controller 620 is configured to implement an approach wherein the sensor data is inaccessible to the application and to a corresponding application server.

The controller 620 is configured to cause detection of a canvas request from the application (compare with step 110 of FIG. 1), wherein the canvas request is associated with an execution request from the application to an application server.

To this end, the controller may comprise, or be otherwise associated with (e.g., connectable, or connected, to), a canvas request detector (DET; e.g., detecting circuitry or a detection module) 621. The canvas request detector 621 may be configured to detect the canvas request from the application (e.g., as described in connection with step 110 of FIG. 1).

The controller 620 is configured to cause selective provision of the sensor data and the canvas request to a spatial map server based on a privacy certification status of the sensor (compare with steps 120 and 130 of FIG. 1).

To this end, the controller may comprise, or be otherwise associated with (e.g., connectable, or connected, to), a selective provider (SP; e.g., selective providing circuitry or a selective provision module) 623. The selective provider 623 may be configured to selectively provide of the sensor data and the canvas request to a spatial map server based on a privacy certification status of the sensor (e.g., as described in connection with steps 120 and 130 of FIG. 1).

For example, the controller 620 may be configured to cause provision of the sensor data to the spatial map server by obtaining and conveying the sensor data to the spatial map server or by triggering the sensor to provide the sensor data to the spatial map server. Alternatively or additionally, the controller 620 may be configured to cause the canvas request to be provided to the spatial map server by obtaining and conveying the canvas request to the spatial map server or by triggering the canvas request to be provided to the spatial map server.

In some embodiments, the controller 620 is configured to cause the sensor data and the canvas request to be provided to the spatial map server responsive to the sensor being approved according to the privacy certification, and/or to cause hindrance of at least the sensor data from being provided to the spatial map server responsive to that approval of the sensor according to the privacy certification is lacking.

The controller 620 may be configured to cause determination of the privacy certification status of the sensor (compare with step 120 of FIG. 1); e.g., by causing transmission of an authorization request to an authorization server, and reception of an authorization response from the authorization server.

To this end, the controller 620 may comprise, or be otherwise associated with (e.g., connectable, or connected, to), an authorizer (AU; e.g., authorizing circuitry or an authorization module) 622. The authorizer 611 may be configured to determine the privacy certification status of the sensor (e.g., as described in connection with step 120 of FIG. 1).

The provision of the sensor data and the canvas request to the spatial map server causes a canvas response to be provided from the spatial map server to the application (compare with step 140 of FIG. 1), wherein the canvas response is for processing by the application of an execution response provided by the application server in response to the execution request. For example, the controller 620 may be configured to cause obtaining and conveyance of the canvas response.

The controller 620 may comprise, or be otherwise associated with (e.g., connectable, or connected, to), a transceiver (TX/RX; e.g., transceiving circuitry or a transceiver module) 630. The transceiver 630 may be configured to transmit and/or receive signaling relating to the control of the sensor data provision. For example, the transceiver 630 may transmit the sensor data and the canvas request to the spatial map server, transmit the execution request to the application server, receive the execution response from the application server, and receive the canvas response from the spatial map server.

It should be noted that suitable features described in connection with any of FIGS. 1-5 may be equally applicable—mutatis mutandis—in the context of FIG. 6, even if not explicitly mentioned in connection thereto. For example, while FIG. 6 illustrates a situation similar to that of FIG. 2A (where the sensor, the application, and the sensor data management controller are all comprised in the wireless communication device), the features of FIG. 6 may be equally applicable—mutatis mutandis—in situations similar to that of FIG. 2B or 2C.

Embodiments described herein may be applicable in a large variety of scenarios. A few examples will be given in the following for illustrative purposes. Other examples, as well as combinations of features from the following examples, may be equally relevant.

In one example, an augmented reality application runs on a smartphone which also has two sensors in the form of a camera and a microphone. A sensor data management controller of the smartphone may selectively convey sensor data for a canvas request from the application to a map server as described herein. For example, the camera may be approved according to a privacy certification for provision of video data in relation to the application while approval according to the privacy certification for provision of sound data in relation to the application may be lacking for the microphone. A canvas request from the application may specify a required size of a substantially horizontal surface in three dimensions, and the application may be configured to render a virtual object specified by an execution response on a corresponding canvas while the video from the camera (and possibly the sound from the microphone) is rendered without being accessed by the application. The latter is particularly relevant for rendering via a video pass through display. The rendering of the sensor data may also be controlled by the sensor data management controller to hinder the application from accessing the sensor data.

In one example, an augmented reality application runs on a gaming device which is associated with a pair of digital glasses having a sensor in the form of a camera. The gaming device may also be associated with other devices (e.g., wearables such as gloves, watches, etc.) having other sensors (e.g., positioning sensors, biometric sensors, etc.). A sensor data management controller in the digital glasses (or in the gaming device) may selectively convey sensor data for a canvas request from the application to a map server as described herein. For example, the camera may be approved according to a privacy certification for provision of video data in relation to the application. A canvas request from the application may specify a color, and the application may be configured to render a virtual notification on a canvas identifying field(s) of the specified color through the digital glasses while no video from the camera is rendered. The latter is particularly relevant for rendering via a see through display.

In one example, a music creation application runs on a computer which is associated with a microphone. A sensor data management controller in the computer may selectively convey sensor data for a canvas request from the application to a map server as described herein. For example, the microphone may be approved according to a privacy certification for provision of sound data in relation to the application. A canvas request from the application may specify a tone of certain frequency and duration, and the application may be configured to render a visual item on a canvas identifying a direction of the specified tone.

In one example, a sensor in the form of a camera may be mountable in a variety of different types of devices, and the privacy certification may specify approval based on the device wherein the camera is mounted. For example, due to legal regulations, approval according to the privacy certification to provide image data may be lacking for the camera when mounted in a drone.

In one example, the privacy certification may specify approval of sensors such as cameras and microphones based on the location of a device in which the sensors are mounted. For example, due to national security, approval according to the privacy certification to provide any data may be lacking for sensors when the device is in certain geographical locations.

In one example, an augmented reality work productivity application runs on a company-owned and employee-used device (e.g., a smartphone, a gaming device, etc.) which is associated with a pair of digital glasses having a sensor in the form of a camera and used by an employee for office work purposes. The device may also be associated with other devices (e.g., wearables; such as gloves, watches, etc.) having other sensors (e.g., positioning sensors, biometric sensors, etc.). A sensor data management controller in the digital glasses (or in the associated device) may selectively convey sensor data for a canvas request from the application to a map server as described herein. For example, the camera may be approved according to a privacy certification for provision of video data in relation to the application. A canvas request from the application may specify a required size of a substantially vertical surface in three dimensions, and the application may be configured to render a virtual object such as a text document specified by an execution response on a corresponding canvas, while the video from the camera (and possibly the sound from the microphone) disclosing the surrounding office environment—where other employees may be handling (and possibly discussing) other (possibly unrelated) documents—is rendered without being accessed by the application. The latter is particularly relevant for rendering via a video pass through display. The rendering of the sensor data may be controlled by the sensor data management controller to hinder the application from accessing the sensor data.

Further exemplification of scenarios suitable for some embodiments will now be described.

Spatial computing has been defined as "human interaction with a machine in which the machine retains and manipulates referents to real objects and spaces". With the advent of consumer virtual reality, augmented reality, and mixed reality, the term "spatial computing" is commonly used in relation to the practice of using physical actions (e.g., head/hand/body movements, gestures, speech, etc.) as inputs for interactive digital media systems, wherein the perceived three-dimensional (3D) physical space is used as basis for system outputs (e.g., video, audio, haptic, etc.). Such systems may be seen as examples of XR/AR applications.

In order to determine suitable locations for digital representations in 3D physical space (e.g., locations for the content of an XR/AR application), sensors are typically used to determine a spatial canvas which may be utilized by the application to appropriately render digital objects in relation to 3D physical space. A spatial canvas may, for example, be a generalized geometric description of 3D space with the lowest resolution that enables the application to correctly render (e.g., place, move, etc.) digital objects in accordance with the requirements of the application. Such geometric description may, for example, comprise a polygon mesh model or a triangle mesh models (e.g., calculated from point cloud data in a spatial map, where each point position is described by a set of Cartesian coordinates).

In some approaches, the application may only be given access to the smallest portion of the geometric description of 3D space that is needed to fulfill the requirements for, e.g., placing a digital representation of an object. Then, the placed digital representation of the object provided by the application may be superimposed with the full 3D representation for rendering.

A problem with hitherto existing ways of employing sensors in order to collect data about physical space is that particulars relating to bystanders may be available to the application.

This problem is mitigated by some embodiments. For example, a bounded environmental privacy zone may be applied for XR/AR applications as suggested herein. This enables XR/AR devices to run applications that can adequately place/move digital objects in physical space without direct access to environmental sensor data for any of the application and the application server. Thus, XR/AR applications may be enabled to execute without violating bystander privacy (e.g., as expressed by subjective bystander concerns, or by regulations such as laws).

The bounded environmental privacy zone for XR/AR applications according to some embodiments may utilize a certification based sensor system that uses a policy to restrict use of sensor data by applications such that the sensor data can only be used by the application in the form of a geometrically generalized spatial canvas. Sending of sensor data outside of the boundaries of the privacy zone is restricted and only certified sensors and devices are allowed to access the system.

For example, an edge network may be used as a standardized, regulated, and/or trusted "middleman" between the sensor(s) and the application side (application and application server). Such edge networks may, for example, be networks deployed by a cloud service provider or by a cellular service provider.

To exemplify use of a bounded environmental privacy zone for XR/AR applications, the involved devices such as a user device and/or any other relevant device (e.g., an Internet-of-Things (IoT) device, a car, etc.) provide information from two separate sources: the application and the sensor(s).

The application (e.g., running on the user device) typically sends the application execution logic to the application server and a spatial canvas request to the spatial map server. For example, an XR/AR application such as a game sends the logic (execution request) "request to place a game avatar on a flat surface" to the application server and the spatial canvas request "request for a flat surface of at least 2×2 meters" to the spatial map server.

The sensor(s) (e.g., comprised in the user device or in peripheral device(s)) send sensor data directly to the spatial map server. For example, a video feed of a flat street crossing is sent to the spatial map server (and to the screen of the user device for rendering).

The application server processes the application logic and sends an execution response to the application. For example, the application server may send a digital representation of a game avatar.

The spatial map server compares the spatial canvas request with the sensor data and responds to the application with a geometrically generalized spatial canvas. For example, the request for a 2×2 meter surface may be compared to the video feed of the street crossing and a spatial canvas in the form of three dimensional coordinates that define an available 2×2 surface is sent to the application.

The application processes the execution response using the canvas response. For example, the application may render the game avatar received from the application server within the coordinates defined by the spatial canvas received from the spatial map server. The game avatar is correctly rendered by the application in relation to the physical 3D space even though neither the application nor the application server has access to the video feed of the street crossing; the video feed is simply passed directly from the camera sensor onto the screen.

By selectively causing the sensor data and the canvas request to be provided to the map server, wherein the selectivity is based on a privacy certification status of the sensor, bystander privacy may be (at least partially) upheld. Preferably, the privacy certification is controlled only by a first trusted party, and cannot be controlled by the user, by the application, or by the application server.

By application of some embodiments, there is no need to filter sensor data (e.g., blur image data) since the application only has access to the canvas from the map server and the sensor data is never exposed directly to the application.

It should be noted that the canvas does not comprise the sensor data itself, nor a portion thereof. The canvas is typically a generalized (e.g., geometric) description of relevant characteristics (i.e., as specified by the canvas request) of the sensor data.

According to some embodiments, a bounded environmental privacy zone for XR/AR applications uses a certification based federated sensor authorization system wherein sensor data sharing policies may be applied. The sensor authorization system may rely on several levels of control (e.g., certification and access control). For example, the control may extend from the sensor component level to the server level in the edge network; operating in conjunction to restrict direct access to (and use of) sensor data by XR/AR applications. This may be achieved by not providing sensor data outside of the privacy zone when it relates to execution by the application, and by restricting provision of sensor data so that the application only gets access to a generalized (e.g., geometric spatial) canvas determined by the map server based on the sensor data. The canvas is usable by the XR/AR application as a guide for placing/moving digital objects in physical space without access to any details of the physical space.

The privacy zone may be used (e.g., simultaneously) by multiple devices according to some embodiments (i.e., the map server may be configured to provide canvases to a plurality of applications running on different devices as long as the certification and authorization criteria are met).

A certification organization may ensure that a device, or a type of device, fulfills the certification criteria, and correspondingly certify the identity of the device. The certification may, for example, be in the form of an issued certificate, or by maintenance of a database comprising the identities of certified devices. An example certification criterion may be that the device comprising the sensor is designed such that sensor data can only be sent (in relation to execution by the application) to the map server.

In some embodiments, certifications may have multiple levels corresponding to different levels of security profiles.

A device is typically certified for a certain firmware version. Before a firmware upgrade is made, a vendor may perform a new certification of the device incorporating the new firmware. A new certificate may be issued for all devices of the same type, or a new certificate may be issued only for updated devices. In any case, a database (list) identifying certified devices may be updated accordingly.

Authorization may comprise a procedure of evaluating devices based on certification and/or environmental properties. For example, authorization may comprise checking whether a device (e.g., a sensor, or a device comprising the sensor) is certified, and—optionally—whether environmental properties (time, location, etc.) allow provision of sensor data according to rules/policies relating to the certification. If the device passes these hurdles, it may be considered authorized to provide sensor data in relation to the application at hand. Authorization may be valid until further notice, for a specified duration of time, or for a specified number of canvas requests. Authorization decision may be performed locally or by sending an authorization request to an authorization server for evaluation. For example, authorization may involve issuing authorization grants/tokens (e.g., according to Oauth2.0) and/or certificates.

An example bounded environmental privacy zone may comprise a sensor component (compare with 213, 313, 413, 513, 613), a certified sensor data management component (compare with 212, 312, 412, 512, 612), a certified spatial map server (compare with 230, 330, 430, 530), an optional device authorization server (compare with 240, 340, 440, 540), and—possibly—a certified user device (compare with 210, 210'', 510, 610) which may or may not comprise the sensor component. These components of the example bounded environmental privacy zone will be exemplified in the following.

Sensor components may be individually certified. Alternatively or additionally, the device comprising a sensor component may be certified as a whole. The sensor component may be of different types. A first type is a certified sensor component, which is disabled by default and for which access can only be authorized for a limited time by a certified sensor data management component for sending sensor data (to other certified sensors or to a certified sensor data management component). A second type is a certified sensor, which is enabled by default and for which access is not restricted, but which fulfill other certification requirements. A third type is an uncertified sensor, which is not allowed to send or access any data within the bounded privacy zone. An uncertified sensor component is typically not able to send/receive any information to/from a certified sensor data management component.

Sensor data management components may be individually certified. Alternatively or additionally, the device comprising a sensor data management component may be certified as a whole. The certified sensor data management component is configured to enable a certified sensor component for allowing it to generate sensor data (e.g., for a limited time). The certified sensor data management component only accepts sensor data from authorized certified sensor components and may be configured to send such sensor data to a spatial map server (e.g., in an edge network). The certified sensor data management component may send the sensor data together with a canvas request (e.g., indicating a list of geodetic requirements; such as the number of objects the application wants to render, their volumetric requirements, their movement particulars, their occlusion behavior, etc.) from the application. In response, the certified sensor data management component may receive a corresponding spatial canvas from the spatial map server. The certified sensor data management component passes the spatial canvas on to the application for use as execution framework. Sensor data management components with any other spatial canvas output capability may be defined as uncertified. An uncertified sensor data management component is typically unable to send/receive any information to/from the privacy zone.

The certified user device has passed a certification process ensuring that the device comprises sensor data management component(s) (e.g., a sensor data management controller) and access-controlled sensor component(s) (e.g., sensor(s)) as described above, wherein the sensor data management component(s) and the access-controlled sensor component(s) may enforce authorization of privacy certification status to be made locally and/or by an authorization server. The user device may be partially or fully certified (depending on the extent of the access-control of the components). A user device that has not passed the certification process is considered uncertified and will typically not be granted access to any parts of the privacy zone.

The certified spatial map server (e.g., in a cellular network) maintains an updated spatial map using sensor data only from certified devices. The spatial map may be one spatial map per certified device (i.e., based only on sensor data from that device), or may be a combined spatial map for two or more certified devices (i.e., based on sensor data from those devices). Spatial map servers with any other sensor data communication capability are uncertified. The spatial map server may be configured to connect to a device authorization server (e.g., in the cellular network) to confirm that the device is certified and download the corresponding sensor data sharing policy. If the device is uncertified, the spatial map server may be configured to hinder it from sending/receiving sensor data and/or from receiving canvas/ map data over the network). The spatial map server may be configured to receive sensor data from the device and update the previously stored spatial map information with differential information of the sensor data. The spatial map server may be configured to construct a spatial canvas based on the sensor data sharing policy for the device using the updated spatial map. The spatial map server may be configured to send the spatial canvas to the certified device, wherein the spatial canvas can be used as a spatial framework by the application. Typically, the certified spatial map server is configured to send spatial canvases only to certified devices, and spatial map servers which are—additionally or alternatively—configured with other canvas sending capabilities (e.g., spatial map servers which are configured to send spatial canvases also to uncertified devices) are uncertified.

The device authorization server is typically operated inside the same network as the spatial map server (e.g., a cellular network) and may be configured to maintain a list of certified devices. In some embodiments, such a list may further indicate a corresponding sensor data sharing policy for each certified device. The device authorization server typically processes sensor data sharing policy requests by certified devices. The device authorization server may be configured to issue authorization tokens for sensor enablement on certified devices.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a sensor device.

Embodiments may appear within an electronic apparatus (such as a wireless communication device or a sensor device) comprising arrangements, circuitry, and/or logic according to any of the embodiments described herein. Alternatively or additionally, an electronic apparatus (such as a wireless communication device or a sensor device) may be configured to perform methods according to any of the embodiments described herein.

Figure 7:
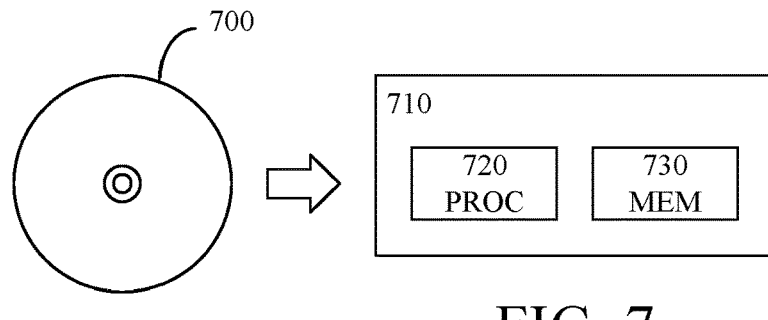
FIG. 7 is a schematic drawing illustrating an example computer readable medium according to some embodiments.

According to some embodiments, a computer program product comprises a non-transitory computer readable medium such as, for example, a universal serial bus (USB) memory, a plug-in card, an embedded drive, or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC; e.g., data processing circuitry, a data processor module, or a data processing unit) 720, which may, for example, be comprised in a wireless communication device or a sensor device 710. When loaded into the data processor, the computer program may be stored in a memory (MEM) 730 associated with, or comprised in, the data processor. According to some embodiments, the computer program may, when loaded into, and run by, the data processor, cause execution of method steps according to any method described herein, e.g., the method 100 illustrated in FIG. 1.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable.

Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of controlling provision of sensor data from a sensor in relation to an application running on a wireless communication device, the method comprising:

detecting a canvas request from the application, wherein the canvas request is associated with an execution request from the application to an application server; and based on a privacy certification status of the sensor, selectively causing the sensor data and the canvas request to be provided to a map server, wherein provision of the sensor data and the canvas request to the map server causes a canvas response to be provided from the map server to the application, the canvas response being for processing by the application of an execution response provided by the application server in response to the execution request, and wherein the sensor data is inaccessible to the application and to the application server.

2. The method of claim 1, wherein selectively causing the sensor data and the canvas request to be provided to the map server based on the privacy certification status of the sensor comprises causing the sensor data and the canvas request to be provided to the map server when the sensor is approved according to the privacy certification.

3. The method of claim 1, wherein selectively causing the sensor data and the canvas request to be provided to the map server based on the privacy certification status of the sensor comprises hindering at least the sensor data from being provided to the map server when approval of the sensor according to the privacy certification is lacking.

4. The method of claim 1, wherein the privacy certification stipulates the sensor to be hindered from providing the sensor data to the application and stipulates the sensor to be hindered from providing the sensor data to the application server.

5. The method of claim 1, wherein the privacy certification requires the sensor to be able to constrain provision of sensor data, which relates to the application, to the map server.

6. The method of claim 1, wherein the canvas response is void of the sensor data.

7. The method of claim 1, wherein the canvas response is determined by the map server based on the sensor data and the canvas request.

8. The method of claim 1, wherein the canvas response comprises a parametrization determined from the sensor data and corresponding to the canvas request.

9. The method of claim 1, wherein the privacy certification is provided by a first trusted party for trusted provision of sensor data in association with operation of the application.

10. The method of claim 1, wherein the map server is controlled by a second trusted party.

11. The method of claim 1, wherein selectively causing the sensor data and the canvas request to be provided to a map server based on the privacy certification status of the sensor comprises applying an environmental sensor data sharing policy for hindering data relating to a bystander from being available to a provider of the application and/or the application server.

12. The method of claim 1, further comprising:

transmitting an authorization request to an authorization server, wherein the authorization request is for authorization to provide sensor data from the sensor to the map server; and receiving an authorization response from the authorization server, wherein the authorization response is indicative of whether provision of sensor data from the sensor to the map server is authorized.

13. The method of claim 1, wherein the sensor is approved in accordance with the privacy certification when the sensor is certified to avoid sharing of sensor data with the application and/or with the application server.

14. The method of claim 1, wherein approval of the sensor in accordance with the privacy certification is conditioned on the sensor being configured for application of a sensor data sharing policy.

15. The method of claim 14, wherein the sensor data sharing policy is un-adjustable by one or more of: a user of the wireless communication device, a user of the sensor, a user of the application, the application, a provider of the application, an execution platform hosting the application, a provider of an execution platform hosting the application, the application server, a provider of the application server, an execution platform hosting the application server, and a provider of an execution platform hosting the application server.

16. The method of claim 1, wherein the canvas comprises a spatial shape in one or more dimensions.

17. An apparatus for controlling provision of sensor data from a sensor in relation to an application running on a wireless communication device, the apparatus comprising controlling circuitry configured to cause:

detection of a canvas request from the application, wherein the canvas request is associated with an execution request from the application to an application server; and based on a privacy certification status of the sensor, selective provision of the sensor data and the canvas request to a map server, wherein provision of the sensor data and the canvas request to the map server causes a canvas response to be provided from the map server to the application, the canvas response being for processing by the application of an execution response provided by the application server in response to the execution request, and wherein the sensor data is inaccessible to the application and to the application server.

18. The apparatus of claim 17, wherein the controlling circuitry is configured to cause selective provision of the sensor data and the canvas request to the map server based on the privacy certification status of the sensor by causing the sensor data and the canvas request to be provided to the map server responsive to the sensor being approved according to the privacy certification.

19. The apparatus of claim 17, wherein the controlling circuitry is configured to cause selective provision of the sensor data and the canvas request to the map server based on the privacy certification status of the sensor by causing hindrance of at least the sensor data from being provided to the map server responsive to that approval of the sensor according to the privacy certification is lacking.

20. The apparatus of claim 17, wherein the canvas response is determined by the map server based on the sensor data and the canvas request.

21. The apparatus of claim 17, wherein the canvas response comprises a parametrization determined from the sensor data and corresponding to the canvas request.

22. The apparatus of claim 17, wherein the privacy certification is provided by a first trusted party for trusted provision of sensor data in association with operation of the application.

23. The apparatus of claim 17, wherein the controlling circuitry is further configured to cause:

detection of a further canvas request from the application, wherein the further canvas request is associated with a further execution request from the application to the application server; and responsive to that less than a specified duration of time has elapsed since previous sensor data was provided, provision of only the further canvas request to the map server, wherein provision of the further canvas request to the map server causes a further canvas response to be provided from the map server to the application, the further canvas response being for processing by the application of a further execution response provided by the application server in response to the further execution request.

24. The apparatus of claim 23, wherein the further canvas response is determined by the map server based on the previous sensor data and the further canvas request.

* * * * *